(12) United States Patent
Bircann

(10) Patent No.: US 9,915,236 B1
(45) Date of Patent: Mar. 13, 2018

(54) FUEL SYSTEM COMPONENT MOUNTING ASSEMBLY WITH RETENTION MEMBER

(71) Applicant: DELPHI TECHNOLOGIES IP LIMITED, St. Michael (BB)

(72) Inventor: Raul A. Bircann, Webster, NY (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 0 days.

(21) Appl. No.: 15/439,352

(22) Filed: Feb. 22, 2017

(51) Int. Cl.
*F02M 69/46* (2006.01)
*F02M 61/14* (2006.01)
*F02M 59/48* (2006.01)
*F02M 55/02* (2006.01)

(52) U.S. Cl.
CPC .......... *F02M 61/14* (2013.01); *F02M 55/025* (2013.01); *F02M 59/48* (2013.01); *F02M 69/465* (2013.01); *F02M 2200/8076* (2013.01); *F02M 2200/855* (2013.01)

(58) Field of Classification Search
CPC .... F02M 69/465; F02M 61/168; F16B 5/0241
See application file for complete search history.

(56) References Cited

U.S. PATENT DOCUMENTS

| | | | |
|---|---|---|---|
| 5,044,338 A * | 9/1991 | Shelton | F02M 69/465 |
| | | | 123/456 |
| 7,591,246 B2 * | 9/2009 | Beardmore | F02M 55/025 |
| | | | 123/456 |
| 8,800,534 B2 | 8/2014 | Kannan | |
| 9,777,688 B2 * | 10/2017 | Rehwald | F02M 61/14 |
| 2001/0037911 A1 * | 11/2001 | Stanienda | F16B 5/0241 |
| | | | 181/207 |
| 2011/0073074 A1 * | 3/2011 | Hay | F02M 55/025 |
| | | | 123/456 |
| 2013/0104852 A1 | 5/2013 | Kannan | |

* cited by examiner

*Primary Examiner* — Amy J. Sterling
(74) *Attorney, Agent, or Firm* — Joshua M. Haines

(57) ABSTRACT

A mounting assembly for a fuel system component with an attachment bracket includes an upper isolation member; an upper isolation member retainer which captures the upper isolation member axially between the upper isolation member and the attachment bracket; a lower isolation member; a lower isolation member retainer which captures the lower isolation member axially between the lower isolation member the attachment bracket; and a retention member extending from the lower isolation member and having a retention member first end and a retention member second end such that the retention member first end is fixed to the lower isolation member retainer and such that the upper isolation member retainer is captured axially between the attachment bracket and the retention member second end.

11 Claims, 4 Drawing Sheets

FUEL SYSTEM COMPONENT MOUNTING ASSEMBLY WITH RETENTION MEMBER

TECHNICAL FIELD OF INVENTION

The present invention relates to a mounting assembly for a fuel system component of an internal combustion engine and more specifically to such a mounting assembly with a retention member which retains the mounting assembly to the fuel system component prior to installation of the fuel system component to the internal combustion engine.

BACKGROUND OF INVENTION

It is well known for modern internal combustion engines to include a fuel system having fuel system components such as fuel injectors and a fuel rail. Each fuel injector is used to meter a precise amount of fuel to a respective combustion chamber of the internal combustion engine for each combustion cycle while the fuel rail provides a volume of pressurized fuel such that each fuel injector is in fluid communication with the volume of the fuel rail. In this way, the fuel rail provides fuel to each fuel injector. The fuel injectors and fuel rail, collectively referred to as fuel system components, may be secured to the internal combustion engine using threaded fasteners which each extend through a respective attachment bracket of each fuel system component, thereby clamping the fuel system component to the internal combustion engine. However, due to the rapid cycling, i.e. rapid opening and closing, of the fuel injectors, mechanical vibrations and pressure pulsations within the fuel are generated by the fuel injectors. Additionally, pressure pulsations caused by the fuel pump which supplies fuel under pressure to the fuel rail and also caused by the pressure pulsations from the fuel injectors are present within the volume of the fuel rail, thereby causing mechanical vibration of the fuel rail. Combustion pressure pulsations acting directly on fuel injector tips further contribute to fuel rail mechanical vibration. Consequently, it is known to isolate the fuel system components using a mounting assembly which includes compliant and resilient isolation members in order to avoid objectionable noise resulting from the mechanical vibrations of the fuel system components. One such mounting assembly is shown in United States Patent Application Publication No. US 2013/0104852 to Kannan. While the mounting assembly of Kannan may be effective for isolating fuel system components, other considerations need to be taken into account. More specifically, in some situations, it is desirable to manufacture the fuel system components in one location and ship them together with the mounting assembly attached thereto to another location where the fuel system component together with the mounting assembly is attached to the internal combustion engine. Retention of the mounting assembly is guaranteed after the fuel system component is attached to the internal combustion engine. However, prior to the fuel system component being attached to the internal combustion engine, for example during shipping, there is a risk that the mounting assembly can disassemble from the fuel system component. Consequently, an arrangement is needed to retain the mounting assembly to the fuel system component prior to the fuel system component being attached to the internal combustion engine. Known retention arrangements, which will be described later, may not always be effective due to manufacturing variations.

What is needed is a mounting assembly for a fuel system component which minimizes or eliminates one or more of the shortcomings as set forth above.

SUMMARY OF THE INVENTION

Briefly described, a mounting assembly is provided which mounts a fuel system component to an internal combustion engine where the fuel system component includes an attachment bracket with an attachment bracket aperture extending therethrough. The mounting assembly includes an upper isolation member defining an upper isolation member aperture extending therethrough along an axis such that the upper isolation member aperture is aligned with the attachment bracket aperture in the direction of the axis; an upper isolation member retainer which captures the upper isolation member axially between the upper isolation member and a first side of the attachment bracket, the upper isolation member retainer defining an upper isolation member retainer aperture extending axially therethrough such that the upper isolation member retainer aperture is aligned with the attachment bracket aperture and with the upper isolation member aperture in the direction of the axis; a lower isolation member defining a lower isolation member aperture extending axially therethrough such that the lower isolation member aperture is aligned with the attachment bracket aperture in the direction of the axis; a lower isolation member retainer which captures the lower isolation member axially between the lower isolation member and a second side of the attachment bracket which opposes the first side of the attachment bracket, the lower isolation member retainer defining a lower isolation member retainer aperture extending axially therethrough such that the lower isolation member retainer aperture is aligned with the attachment bracket aperture and with the lower isolation member aperture in the direction of the axis; and a retention member extending from the lower isolation member and having a retention member first end and a retention member second end such that the retention member first end is fixed to the lower isolation member retainer and such that the upper isolation member retainer is captured axially between the attachment bracket and the retention member second end.

A mounting assembly is also provided which mounts a fuel system component to an internal combustion engine where the fuel system component includes an attachment bracket with an attachment bracket aperture extending therethrough along an axis. The mounting assembly includes an upper isolation member; an upper isolation member retainer which captures the upper isolation member axially between the upper isolation member and a first side of the attachment bracket; a lower isolation member; a lower isolation member retainer which captures the lower isolation member axially between the lower isolation member and a second side of the attachment bracket which opposes the first side of the attachment bracket; and a retention member extending from the lower isolation member and having a retention member first end and a retention member second end such that the retention member first end is fixed to the lower isolation member retainer and such that the upper isolation member retainer is captured axially between the attachment bracket and the retention member second end.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

The description that follows uses spatial relation terms such as upper, lower, upward, and downward which are used in connection with the figures. Such terms of spatial relation do not imply an orientation in use of the described apparatus.

Figure 1:
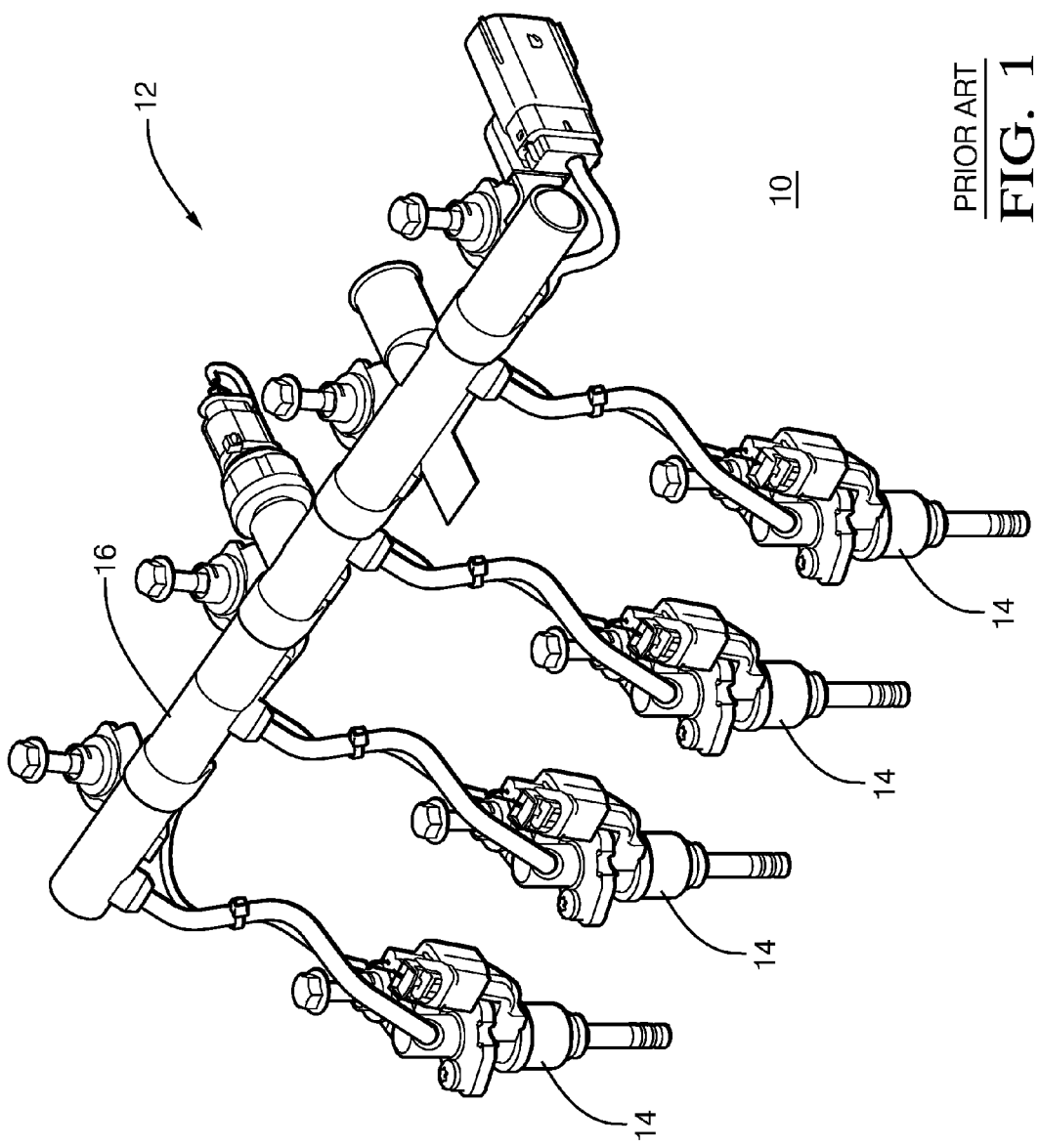
FIG. 1 is an isometric view of a prior art fuel system for an internal combustion engine.
Figure 2:
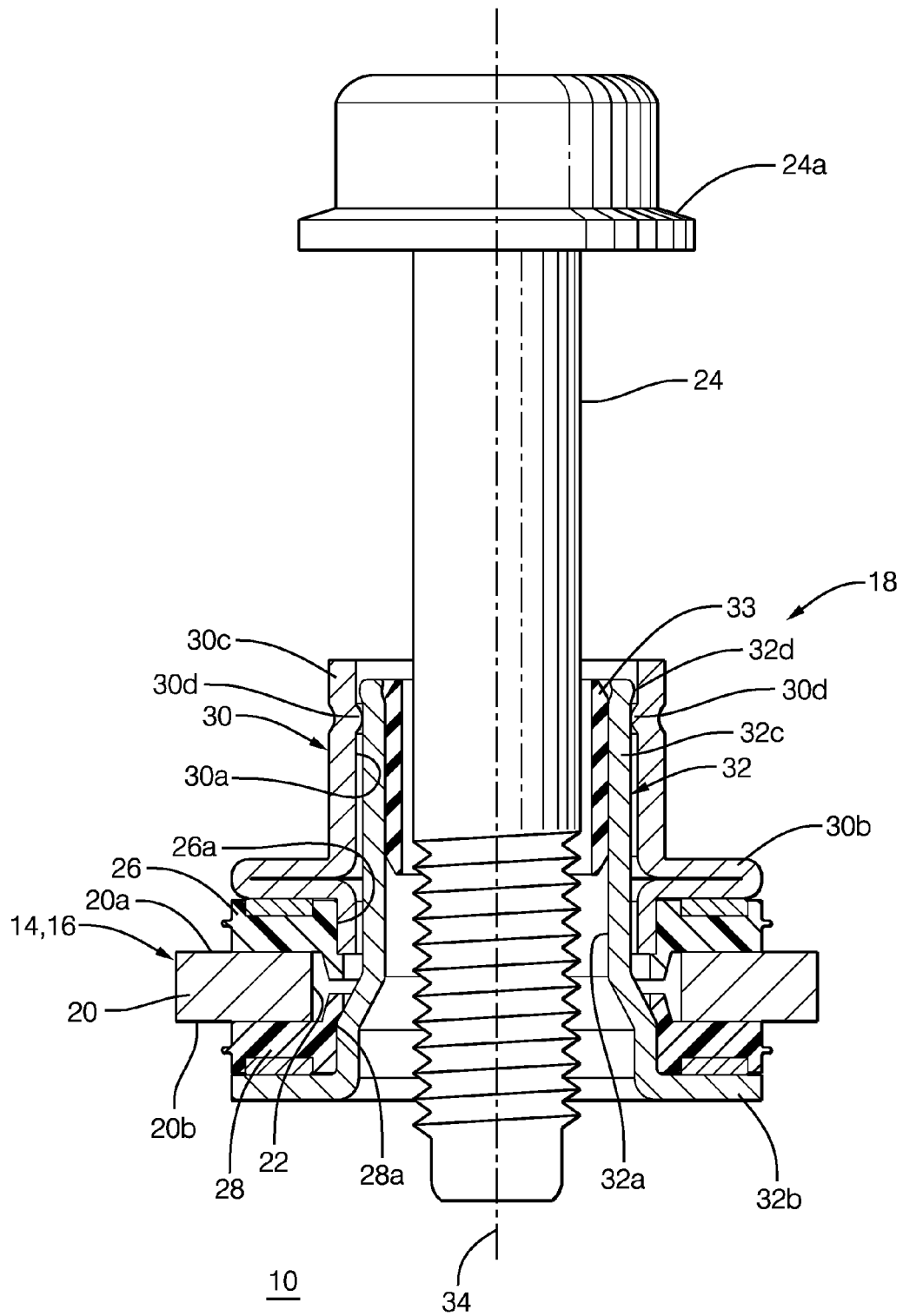
FIG. 2 is an axial cross-sectional view of a prior art mounting assembly for a fuel system component.

With reference to FIGS. 1 and 2 of the prior art, an internal combustion engine 10 is shown with a fuel system 12 which delivers fuel to internal combustion engine 10 for combustion therein. Fuel system 12 includes a plurality of fuel injectors which are each designated as fuel injector 14. Each fuel injector 14 is in fluid communication with a fuel rail 16 which receives fuel under pressure from a fuel source (not shown), which may be, by way of non-limiting example only, a fuel tank and one or more fuel pumps as is well known to those of ordinary skill in the art of internal combustion engines. Each fuel injector 14 and fuel rail 16 are mounted to internal combustion engine 10 with threaded fasteners. Each fuel injector 14 and/or fuel rail 16 may include a mounting assembly 18 in order to accommodate manufacturing tolerances between fuel system 12 and internal combustion engine 10 and in order to attenuate shock and vibration between fuel system 12 and internal combustion engine 10. Mounting assembly 18 used in connection with mounting each fuel injector 14 to internal combustion engine 10 may be substantially the same as mounting assembly 18 used in connection with mounting fuel rail 16 to internal combustion engine 10, and consequently, the description of mounting assembly 18 which follows will be described concurrently for each fuel injector 14 and fuel rail 16. Also consequently, each fuel injector 14 and fuel rail 16 will be referred to generically as fuel system component 14, 16.

In order to facilitate mounting of fuel system component 14, 16 to internal combustion engine 10, fuel system component 14, 16 includes an attachment bracket 20 extending therefrom within which is defined an attachment bracket aperture 22 extending through attachment bracket 20. As shown, attachment bracket aperture 22 may be a closed, circular aperture, however, attachment bracket aperture 22 may alternatively be an elongated slot and may also alternatively be an open aperture, i.e. attachment bracket aperture 22 may open to the edge of attachment bracket 20.

Mounting assembly 18 captures attachment bracket 20 and a threaded fastener 24, which extends through mounting assembly 18 and attachment bracket aperture 22, threadably engages internal combustion engine 10, thereby clamping attachment bracket 20 to internal combustion engine 10. Mounting assembly 18 includes an upper isolation member 26 disposed on a first side 20a of attachment bracket 20, a lower isolation member 28 disposed on a second side 20b of attachment bracket 20 which opposes first side 20a, an upper isolation member retainer 30 which captures upper isolation member 26 between first side 20a and upper isolation member retainer 30, a lower isolation member retainer 32 which captures lower isolation member 28 between second side 20b and lower isolation member retainer 32, and a threaded fastener retainer 33 which retains threaded fastener 24 to mounting assembly 18. Upper isolation member 26, lower isolation member 28, upper isolation member retainer 30, lower isolation member retainer 32, and threaded fastener retainer 33 will be described in detail in the paragraphs that follow.

Upper isolation member 26 consists of a metal wave spring over-molded by elastomeric material which may be natural rubber, synthetic rubber, and blends thereof such that upper isolation member 26 is resilient and compliant. Upper isolation member 26 may be annular in shape as shown such that upper isolation member 26 defines an upper isolation member aperture 26a extending therethrough along an axis 34. Upper isolation member aperture 26a is aligned with attachment bracket aperture 22 in the direction of axis 34; however, upper isolation member aperture 26a and attachment bracket aperture 22 are not required to be concentric. As shown, a portion of upper isolation member 26 may extend axially downward into attachment bracket aperture 22.

Similarly, lower isolation member 28 consists of a metal wave spring over-molded by elastomeric material which may be natural rubber, synthetic rubber, and blends thereof such that lower isolation member 28 is resilient and compliant. Lower isolation member 28 may be annular in shape as shown such that lower isolation member 28 defines a lower isolation member aperture 28a extending therethrough in the same direction as axis 34. Lower isolation member aperture 28a is aligned with attachment bracket aperture 22 in the direction of axis 34; however, lower isolation member aperture 28a and attachment bracket aperture 22 are not required to be concentric. As shown, a portion of lower isolation member 28 may extend axially upward into attachment bracket aperture 22.

Upper isolation member retainer 30 defines an upper isolation member retainer aperture 30a extending axially therethrough in the same direction as axis 34 such that upper isolation member retainer aperture 30a is aligned with attachment bracket aperture 22 and with upper isolation member aperture 26a in the direction of axis 34; however, upper isolation member retainer aperture 30a, attachment bracket aperture 22, and upper isolation member aperture 26a are not required to be concentric. Upper isolation member retainer 30 includes an upper isolation member retainer flange 30b which is annular in shape and also defines an upper isolation member retainer compression section 30c which extends axially from upper isolation member retainer flange 30b in a direction away from upper isolation member 26. For clarity, upper isolation member retainer aperture 30a extends entirely through both upper isolation member retainer flange 30b and upper isolation member retainer compression section 30c. Upper isolation member retainer compression section 30c may include one or more protrusions 30d which extend radially inward into upper isolation member retainer aperture 30a. Upper isolation member retainer 30 is preferably made of a metallic material and may most preferably be made from a sheet of metal which is deformed using conventional punching, stamping, and deep drawing techniques to form the features described herein. Alternatively, upper isolation member retainer 30 may be machined from a bar of metal.

Lower isolation member retainer 32 defines a lower isolation member retainer aperture 32a extending axially therethrough in the same direction as axis 34 such that lower isolation member retainer aperture 32a is aligned with attachment bracket aperture 22 and with lower isolation member aperture 28a in the direction of axis 34; however, lower isolation member retainer aperture 32a, attachment bracket aperture 22, and lower isolation member aperture 28a are not required to be concentric. Lower isolation member retainer 32 includes a lower isolation member retainer flange 32b which is annular in shape and also defines a lower isolation member compression limiter 32c which extends axially from lower isolation member retainer flange 32b through lower isolation member aperture 28a, attachment bracket aperture 22, upper isolation member aperture 26a, and into upper isolation member retainer aperture 30a. For clarity, lower isolation member retainer aperture 32a extends entirely through both lower isolation member retainer flange 32b and lower isolation member compression limiter 32c. As shown in FIG. 2, upper isolation member retainer compression section 30c extends axially beyond lower isolation member compression limiter 32c in the upward direction prior to threaded fastener 24 being tightened. Lower isolation member compression limiter 32c includes a lip 32d at the axial end of lower isolation member compression limiter 32c which is opposite from lower isolation member retainer flange 32b. Lip 32d protrudes around the entire outer perimeter of lower isolation member compression limiter 32c such that protrusions 30d of upper isolation member retainer 30 mechanically interlock with lip 32d, thereby securing the assembly together prior to threaded fastener 24 being tightened to internal combustion engine 10. Lower isolation member retainer 32 is preferably made of a metallic material and may most preferably be made from a sheet of metal which is deformed using conventional punching, stamping, and deep drawing techniques to form the features described herein. Alternatively, lower isolation member retainer 32 may be machined from a bar of metal.

Threaded fastener retainer 33 is preferably made of a plastic or elastomer material which is fixed within lower isolation member retainer aperture 32a, by way of non-limiting example only, by interference fit or bonding with an adhesive. Threaded fastener retainer 33 is a simple hollow cylinder which allows insertion of threaded fastener 24 therethrough while providing sufficient resistance for preventing removal therefrom prior to threaded fastener 24 being tightened to internal combustion engine 10.

In order to install fuel system 12 to internal combustion engine 10, lower isolation member retainer flange 32b is placed in contact with internal combustion engine 10 and threaded fastener 24 is tightened. When threaded fastener 24 is tightened to internal combustion engine 10, a head 24a of threaded fastener 24 first comes into contact with upper isolation member retainer compression section 30c which causes the distance between upper isolation member retainer flange 30b and lower isolation member retainer flange 32b to be decreased as threaded fastener 24 is tightened, thereby causing upper isolation member 26 and lower isolation member 28 to be compressed in the direction of axis 34. Upper isolation member 26 and lower isolation member 28 continue to be compressed until threaded fastener 24 is tightened to internal combustion engine 10 sufficiently far so as to cause head 24a to come into contact with lower isolation member compression limiter 32c. In this way, upper isolation member retainer compression section 30c limits compression of upper isolation member 26 and lower isolation member 28.

Fuel system 12 may be manufactured at one location and shipped to a different location where fuel system 12 is subsequently assembled to internal combustion engine 10. Protrusions 30d of upper isolation member retainer 30 being captured below lip 32d of lower isolation member retainer 32 are relied upon in order to retain mounting assembly 18 to attachment bracket 20. However, due to manufacturing variations in attachment bracket 20, upper isolation member 26, lower isolation member 28, upper isolation member retainer 30, and lower isolation member retainer 32, protrusions 30d and lip 32d may not always be effective for retaining mounting assembly 18 to attachment bracket 20. In-transit mechanical inputs resulting from road irregularities and vibration and shock could induce local assembly forces which could exceed retentive forces described per aforementioned, thereby resulting in objectionable detached assemblies prior to installation on engine.

Figure 3:
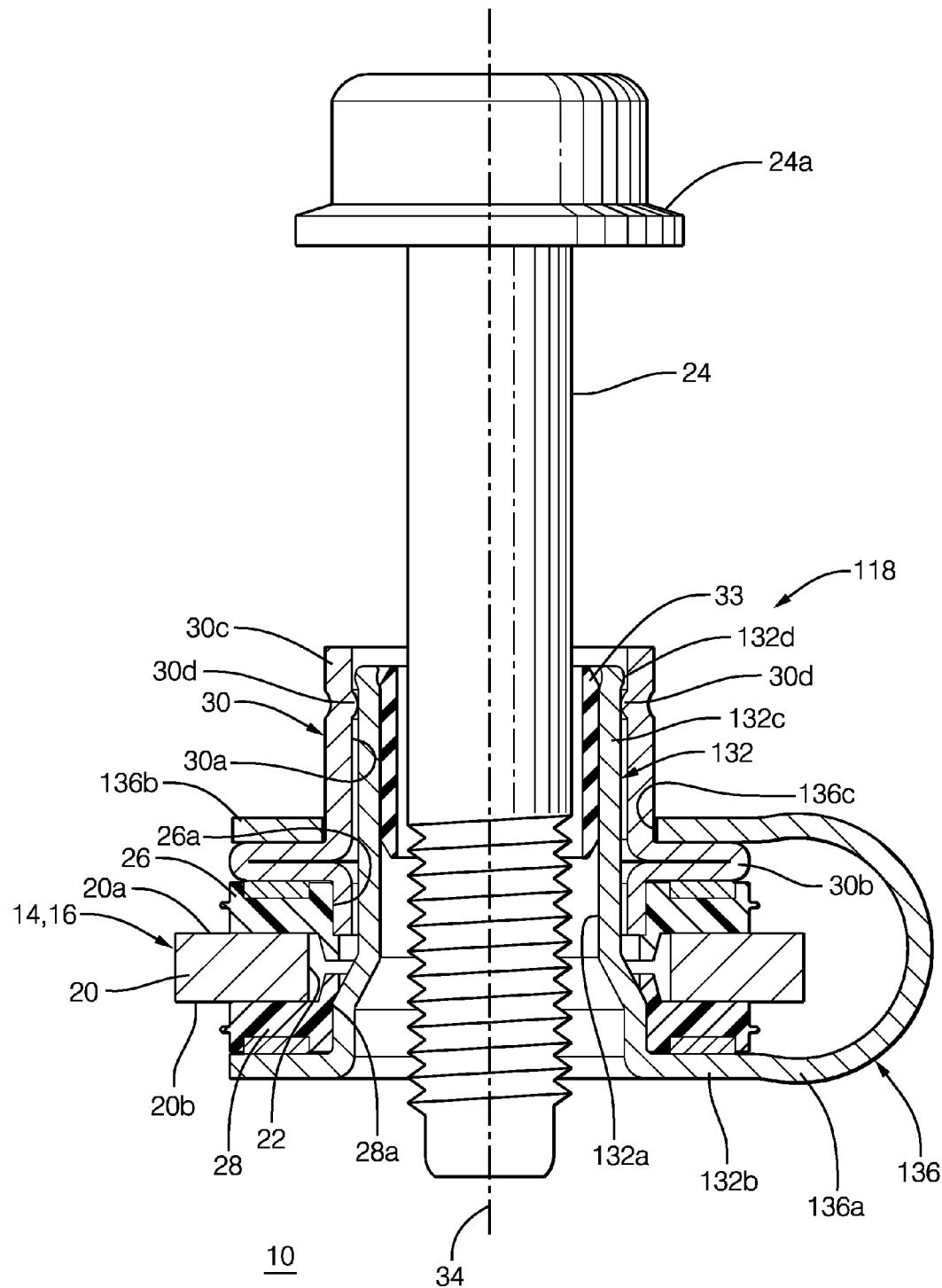
FIG. 3 is an axial cross-sectional view of a mounting assembly in accordance with the present invention for a fuel system component.
Figure 4:
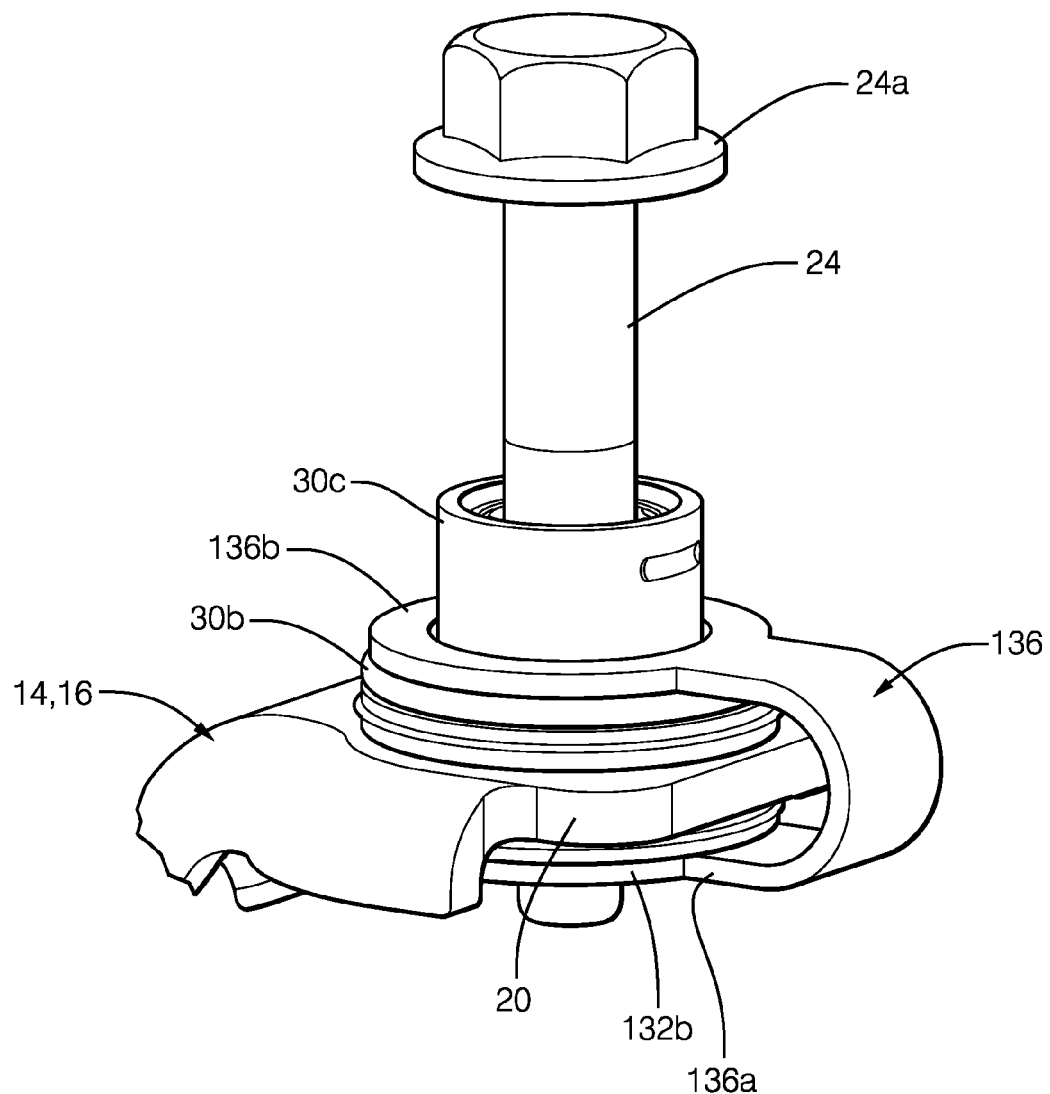
FIG. 4 is an isometric view of the mounting assembly of FIG. 3.

Reference will now be made to FIGS. 3 and 4 which illustrate a mounting assembly 118 which provides improved retention to attachment bracket 20 prior to threaded fastener 24 being tightened to internal combustion engine 10. Reference numbers from mounting assembly 18 will be used to describe features of mounting assembly 118 when the features are substantially identical to mounting assembly 18 while one-hundred series numbers will be used to describe features of mounting assembly 118 which are distinct from mounting assembly 18.

Just as in mounting assembly 18, mounting assembly 118 includes upper isolation member 26, lower isolation member 28, upper isolation member retainer 30, and threaded fastener retainer 33, however, lower isolation member retainer 32 is replaced with lower isolation member retainer 132. The description provided previously for upper isolation member 26, lower isolation member 28, upper isolation member retainer 30, and threaded fastener retainer 33 will serve as the relevant description in connection with mounting assembly 118. In the paragraphs that follow, lower isolation member retainer 132 will be described.

Lower isolation member retainer 132 defines a lower isolation member retainer aperture 132a extending axially therethrough in the same direction as axis 34 such that that lower isolation member retainer aperture 132a is aligned with attachment bracket aperture 22 and with lower isolation member aperture 28a in the direction of axis 34; however, lower isolation member retainer aperture 132a, attachment bracket aperture 22, and lower isolation member aperture 28a are not required to be concentric. Lower isolation member retainer 132 includes a lower isolation member retainer flange 132b which is annular in shape and also defines a lower isolation member retainer compression limiter 132c which extends axially from lower isolation member retainer flange 132b through lower isolation member aperture 28a, attachment bracket aperture 22, upper isolation member aperture 26a, and into upper isolation member retainer aperture 30a. For clarity, lower isolation member retainer aperture 132a extends entirely through both lower isolation member retainer flange 132b and lower isolation member retainer compression limiter 132c. Lower isolation member retainer compression limiter 132c comprises lip 132d at the axial end of lower isolation member retainer compression limiter 132c which is opposite from lower isolation member retainer flange 132b. Lip 132d protrudes around the entire outer perimeter of lower isolation member retainer compression limiter 132c such that protrusions 30d of upper isolation member retainer 30 mechanically interlock with lip 132*d*, thereby securing the assembly together prior to threaded fastener 24 being tightened to internal combustion engine 10. However, it should be noted that lip 132*d* and protrusions 30*d* may be omitted in mounting assembly 118 due to the improved retention feature which will be described in the following paragraph.

As described thus far, lower isolation member retainer 132 is similar to lower isolation member retainer 32. However, lower isolation member retainer 132 differs by the inclusion of a retention member 136. Retention member 136 extends from lower isolation member retainer 132, and more specifically, extends from lower isolation member retainer flange 132*b*. Retention member 136 includes a retention member first end 136*a* which is fixed to lower isolation member retainer 132, and more specifically is fixed to lower isolation member retainer flange 132*b*. As shown, retention member first end 136*a* is preferably fixed to lower isolation member retainer 132 by being integrally formed therewith from the same piece of material, but may alternatively be formed separately therefrom and subsequently fixed thereto, for example, by welding or mechanical fasteners. Retention member 136 also includes a retention member second end 136*b* which is at the end of retention member 136 that is distal from retention member first end 136*a*. The portion of retention member 136 which is intermediate of retention member first end 136*a* and retention member second end 136*b* is formed to cause retention member second end 136*b* to be offset from retention member first end 136*a* in the direction of axis 34. As a result, upper isolation member retainer 30, upper isolation member 26, attachment bracket 20, and lower isolation member 28 are captured axially between lower isolation member retainer flange 132*b* and retention member second end 136*b*, thereby constraining movement of upper isolation member retainer 30, upper isolation member 26, attachment bracket 20, and lower isolation member 28 between lower isolation member retainer flange 132*b* and retention member second end 136*b* in the direction of axis 34. As shown, retention member second end 136*b* defines a retention member aperture 136*c* extending therethrough in the direction of axis 34 such that upper isolation member retainer compression section 30*c* and lower isolation member retainer compression limiter 132*c* pass through retention member aperture 136*c*. Retention member 136 is made of a material of sufficient strength and size which provides sufficient resistance to prevent disassembly of mounting assembly 18 from attachment bracket 20 prior to threaded fastener 24 being tightened to internal combustion engine 10. Lower isolation member retainer 132 is preferably made of a metallic material and may most preferably be made from a sheet of metal which is deformed using conventional punching, stamping, and deep drawing techniques to form the features described herein. When upper isolation member 26, lower isolation member 28, upper isolation member retainer 30, and lower isolation member retainer 132 are initially assembled to attachment bracket 20, retention member 136 is preferably not formed such that retention member second end 136*b* is in its final spatial position relative to retention member first end 136*a*. Instead, retention member 136 is preferably formed to its final shape, for example, by bending the portion of retention member 136 that is intermediate of retention member first end 136*a* and retention member second end 136*b* to be U-shaped in an operation that follows upper isolation member 26, lower isolation member 28, upper isolation member retainer 30, and lower isolation member retainer 132 being assembled to attachment bracket 20.

Retention member 136 provides for reliable and economical retention of mounting assembly 118 to attachment bracket 20 prior to fuel system component 14, 16 being installed to internal combustion engine 10. Retention member 136 is not sensitive to manufacturing variations of attachment bracket 20, upper isolation member 26, lower isolation member 28, upper isolation member retainer 30, and lower isolation member retainer 32 which may affect retention of mounting assembly 18 to attachment bracket 20 which is a known shortcoming of prior art retention arrangements.

While this invention has been described in terms of preferred embodiments thereof, it is not intended to be so limited, but rather only to the extent set forth in the claims that follow.

I claim:

1. A mounting assembly which mounts a fuel system component to an internal combustion engine, said fuel system component comprising an attachment bracket with an attachment bracket aperture extending therethrough, said mounting assembly comprising:
   an upper isolation member defining an upper isolation member aperture extending therethrough along an axis such that said upper isolation member aperture is aligned with said attachment bracket aperture in the direction of said axis;
   an upper isolation member retainer which captures said upper isolation member axially between said upper isolation member and a first side of said attachment bracket, said upper isolation member retainer defining an upper isolation member retainer aperture extending axially therethrough such that said upper isolation member retainer aperture is aligned with said attachment bracket aperture and with said upper isolation member aperture in the direction of said axis;
   a lower isolation member defining a lower isolation member aperture extending axially therethrough such that said lower isolation member aperture is aligned with said attachment bracket aperture in the direction of said axis;
   a lower isolation member retainer which captures said lower isolation member axially between said lower isolation member and a second side of said attachment bracket which opposes said first side of said attachment bracket, said lower isolation member retainer defining a lower isolation member retainer aperture extending axially therethrough such that said lower isolation member retainer aperture is aligned with said attachment bracket aperture and with said lower isolation member aperture in the direction of said axis; and
   a retention member extending from said lower isolation member and having a retention member first end and a retention member second end such that said retention member first end is fixed to said lower isolation member retainer and such that said upper isolation member retainer is captured axially between said attachment bracket and said retention member second end.

2. A mounting assembly as in claim 1 wherein said lower isolation member retainer comprises:
   a lower isolation member retainer flange which is annular in shape such that said lower isolation member is captured axially between said lower isolation member retainer flange and said second side of said attachment bracket; and a lower isolation member retainer compression limiter which extends from said lower isolation member retainer flange through said lower isolation member aperture, said attachment bracket aperture, said upper isolation member retainer aperture, and into said upper isolation member aperture.

3. A mounting assembly as in claim 2 wherein:
said retention member second end defines a retention member aperture; and
said lower isolation member retainer compression limiter passes through said retention member aperture.

4. A mounting assembly as in claim 2 wherein said upper isolation member retainer comprises:
an upper isolation member retainer flange which is annular in shape such that said that said upper isolation member is captured axially between said upper isolation member retainer flange and said first side of said attachment bracket; and
an upper isolation member retainer compression section which extends axially from said upper isolation member retainer flange in a direction away from said upper isolation member;
wherein said lower isolation member retainer compression limiter extends into said upper isolation member retainer compression section.

5. A mounting assembly as in claim 4 wherein:
said retention member second end defines a retention member aperture; and
said upper isolation member retainer compression section passes through said retention member aperture.

6. A mounting assembly as in claim 4 wherein said upper isolation member retainer flange is captured axially between said attachment bracket and said retention member second end.

7. A mounting assembly as in claim 1 wherein said upper isolation member retainer, said upper isolation member, said attachment bracket, and said lower isolation member are captured axially between said lower isolation member retainer and said retention member second end such that said retention member constrains movement of said upper isolation member, said upper isolation member retainer, said attachment bracket, and said lower isolation member between said lower isolation member retainer and said retention member second end in the direction of said axis.

8. A mounting assembly as in claim 1 wherein said upper isolation member and said lower isolation member each comprise an elastomer which is resilient and compliant.

9. A mounting assembly which mounts a fuel system component to an internal combustion engine, said fuel system component comprising an attachment bracket with an attachment bracket aperture extending therethrough along an axis, said mounting assembly comprising:
an upper isolation member;
an upper isolation member retainer which captures said upper isolation member axially between said upper isolation member and a first side of said attachment bracket;
a lower isolation member;
a lower isolation member retainer which captures said lower isolation member axially between said lower isolation member and a second side of said attachment bracket which opposes said first side of said attachment bracket; and
a retention member extending from said lower isolation member and having a retention member first end and a retention member second end such that said retention member first end is fixed to said lower isolation member retainer and such that said upper isolation member retainer is captured axially between said attachment bracket and said retention member second end.

10. A mounting assembly as in claim 9 wherein said upper isolation member retainer, said upper isolation member, said attachment bracket, and said lower isolation member are captured axially between said lower isolation member retainer and said retention member second end such that said retention member constrains movement of said upper isolation member, said upper isolation member retainer, said attachment bracket, and said lower isolation member between said lower isolation member retainer and said retention member second end in the direction of said axis.

11. A mounting assembly as in claim 9 wherein said upper isolation member and said lower isolation member each comprise an elastomer which is resilient and compliant.

\* \* \* \* \*